United States Patent
Eguchi

(10) Patent No.: US 9,119,177 B2
(45) Date of Patent: Aug. 25, 2015

(54) RADIO BASE STATION AND METHOD FOR SELECTING FREQUENCY BAND OF RADIO BASE STATION

(75) Inventor: Hidehiro Eguchi, Yokohama (JP)

(73) Assignee: KYOCERA Corporation, Kyoto (JP)

(*) Notice: Subject to any disclaimer, the term of this patent is extended or adjusted under 35 U.S.C. 154(b) by 507 days.

(21) Appl. No.: 13/518,730

(22) PCT Filed: Dec. 22, 2010

(86) PCT No.: PCT/JP2010/007453
§ 371 (c)(1),
(2), (4) Date: Sep. 4, 2012

(87) PCT Pub. No.: WO2011/077729
PCT Pub. Date: Jun. 30, 2011

(65) Prior Publication Data
US 2012/0322490 A1    Dec. 20, 2012

(30) Foreign Application Priority Data
Dec. 24, 2009   (JP) .................................. 2009-293171

(51) Int. Cl.
*H04W 72/00*   (2009.01)
*H04W 72/02*   (2009.01)
(Continued)

(52) U.S. Cl.
CPC .............. *H04W 72/02* (2013.01); *H04W 28/04* (2013.01); *H04W 28/16* (2013.01); *H04W 88/08* (2013.01)

(58) Field of Classification Search
CPC ..... H04W 72/02; H04W 28/16; H04W 28/04; H04W 88/08
USPC .............. 455/446–452.2, 464, 509, 524, 525; 370/329
See application file for complete search history.

(56) References Cited

U.S. PATENT DOCUMENTS 6,272,335 B1 * 8/2001 Nakayama et al. ......... 455/422.1
6,453,166 B1 * 9/2002 Ishikawa et al. ............. 455/450
(Continued)

FOREIGN PATENT DOCUMENTS

JP   2000-022712 A   1/2000
JP   2001-119334 A   4/2001
(Continued)

OTHER PUBLICATIONS

An Office Action issued by the Japanese Patent Office on Aug. 27, 2013, which corresponds to Japanese Patent Application No. 2009-293171 and is related to U.S. Appl. No. 13/518,730; with Concise Explanation.
(Continued)

*Primary Examiner* — Dominic E Rego
(74) *Attorney, Agent, or Firm* — Studebaker & Brackett PC

(57) ABSTRACT

A method and a radio base station for autonomously adjusting a frequency band to be used by the base station that is newly installed, in order to prevent from deteriorating quality of radio waves of existing peripheral base stations, are provided.

The radio base station connected to a line concentrator via a trunk and configured to communicate with a radio terminal includes an acquisition unit configured to acquire an available frequency band based on a radio communication condition of the peripheral base station prior to start of an operation for a radio communication with the radio terminal, and a selection unit configured to select, at start of the radio communication with the radio terminal, a frequency band to use for the communication with the radio terminal from the available frequency band.

8 Claims, 8 Drawing Sheets

(51) Int. Cl.
  *H04W 28/16* (2009.01)
  *H04W 28/04* (2009.01)
  *H04W 88/08* (2009.01)

(56) References Cited

U.S. PATENT DOCUMENTS

| | | | |
|---|---|---|---|
| 6,882,846 B1 | 4/2005 | O'Byrne | |
| 2001/0016499 A1* | 8/2001 | Hamabe | 455/454 |
| 2002/0111163 A1* | 8/2002 | Hamabe | 455/425 |
| 2005/0099972 A1 | 5/2005 | Motegi et al. | |
| 2006/0227751 A1* | 10/2006 | Theobold et al. | 370/338 |
| 2007/0115878 A1* | 5/2007 | Ashish et al. | 370/329 |
| 2008/0013477 A1* | 1/2008 | Claussen et al. | 370/328 |
| 2008/0279259 A1* | 11/2008 | Kobayashi et al. | 375/135 |
| 2009/0005108 A1* | 1/2009 | Choi et al. | 455/525 |
| 2009/0016291 A1 | 1/2009 | Oota et al. | |

FOREIGN PATENT DOCUMENTS

| | | | |
|---|---|---|---|
| JP | 2002-510914 A | 4/2002 |
| JP | 2002-218528 A | 8/2002 |
| JP | 2005-142967 A | 6/2005 |
| JP | 2007-068070 A | 3/2007 |
| JP | 2008-219061 A | 9/2008 |
| WO | 2007/108077 A1 | 9/2007 |

OTHER PUBLICATIONS

An Office Action; "Notice of Reason for Rejection," issued by the Japanese Patent Office on Jul. 29, 2014, which corresponds to Japanese Patent Application No. 2013-243778 and is related to U.S. Appl. No. 13/518,730; with English language concise explanation.
International Search Report; PCT/JP2010/007453; Feb. 8, 2011.
An Office Action; "Notice of Reasons for Rejection," issued by the Japanese Patent Office on Dec. 9, 2014, which corresponds to Japanese Patent Application No. 2013-243778 and is related to U.S. Appl. No. 13/518,730; with English language concise explanation.

\* cited by examiner

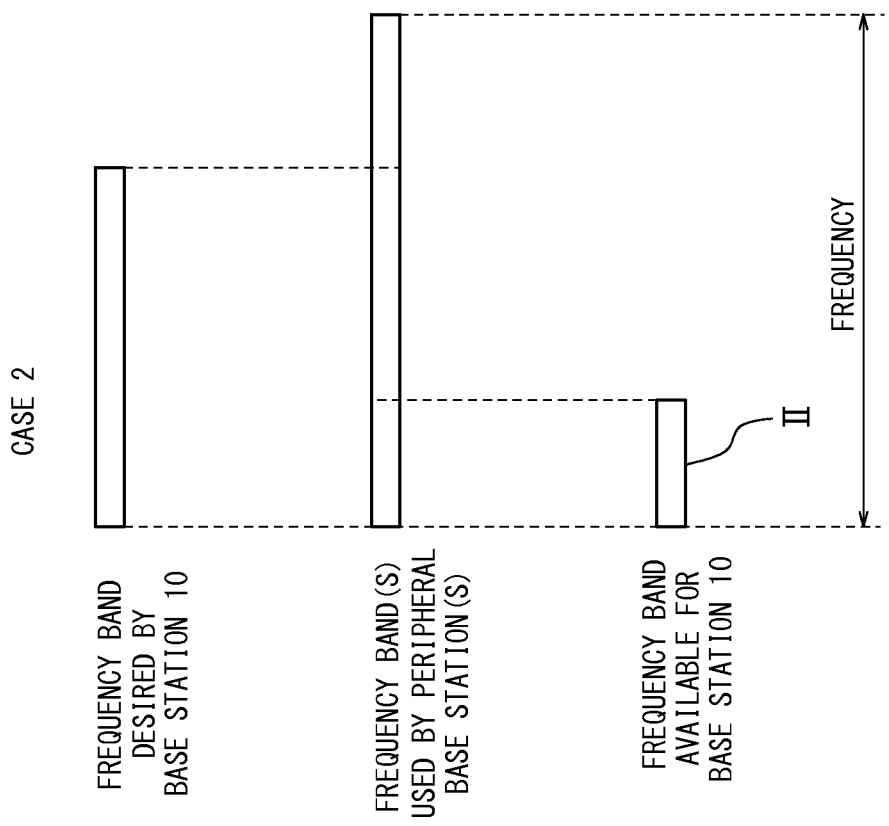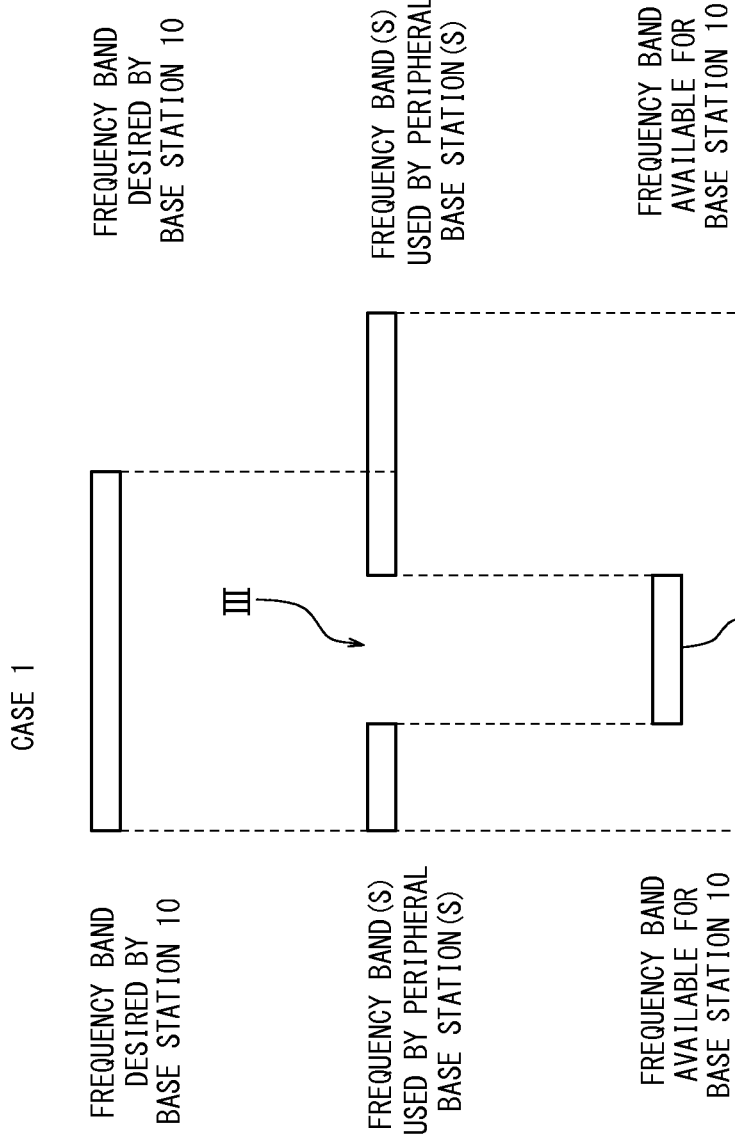

RADIO BASE STATION AND METHOD FOR SELECTING FREQUENCY BAND OF RADIO BASE STATION

CROSS REFERENCE TO RELATED APPLICATION

This application claims priority to and the benefit of Japanese Patent Application No. 2009-293171 filed on Dec. 24, 2009, the entire contents of which are incorporated herein by reference.

TECHNICAL FIELD

The present invention relates to a radio base station and a method for selecting a frequency band of the radio base station.

BACKGROUND ART

As a common method for an improvement in a communication environment of a radio communication, there is installation of a new base station. In this case, however, the newly installed base station may possibly affect a radio communication environment of an existing peripheral base station by assigning an unoccupied radio resource to a terminal requesting for a connection, regardless of a degree of possible interference with the existing peripheral base station.

In installing the new radio base station, therefore, a field test is conducted to select a potential position to install the new base station and, based on a measurement to find out a frequency band which severely interferes with the existing base station in the periphery of the potential position, to select a less-affecting frequency band as the frequency band to be used by the new base station as well as to determine maximum transmission power of the new base station. In the field test, a spectrum analyzer and an apparatus for collecting communication quality data (see Patent Document 1) are used. Then, the base station is manually adjusted to use the frequency band and the transmission power which are determined.

RELATED ART DOCUMENT

Patent Document

Patent Document 1: Japanese Patent Laid-Open No. 2001-119334

SUMMARY OF INVENTION

Technical Problem

However, it is inefficient to conduct the field test in the periphery of an installing position each time the radio base station is installed, as the field test requires a staff and special equipments such as the spectrum analyzer and the apparatus for collecting the communication quality data. Therefore, such a technique has recently been requested as to allow the base station itself to autonomously adjust parameters such as the frequency to use and a maximum transmission output.

Accordingly, it is an object of the present invention, in consideration of the above circumstance, to provide a method and a base station which, in installation of a new base station, autonomously adjust a frequency band used by the new base station without the field test which requires a staff for working thereon, in order to prevent from deteriorating quality of radio waves of existing peripheral base stations.

Solution to Problem

In order to achieve the above object, a first aspect of the invention is a radio base station connected to a line concentrator via a trunk and configured to communicate with a radio terminal, including:
 an acquisition unit configured to acquire an available frequency band based on a radio communication condition of a peripheral base station, prior to start of a radio communication with the radio terminal; and
 a selection unit configured to select, at start of the operation for the radio communication with the radio terminal, a frequency band to be used for the communication with the radio terminal from the available frequency band.

A second aspect of the present invention is the radio base station according to the first aspect, further including a line connection unit configured to communicate with the peripheral radio base station via the trunk and the line concentrator, wherein
 the acquisition unit transmits information including a frequency band desired by the self base station from the line connection unit to the peripheral radio base station and acquires the radio communication condition based on a response on the information received from the line connection unit via the trunk.

A third aspect of the present invention is the radio base station according to the first aspect, wherein
 the acquisition unit acquires the available frequency band based on received power of a downlink frequency band and an uplink frequency band used by the peripheral radio base station.

A fourth aspect of the present invention is the radio base station according to the third aspect, wherein
 the acquisition unit acquires a frequency band other than a frequency band having the received power exceeding a predetermined threshold as the available frequency band.

Further, in order to achieve the above object, a fifth aspect of the invention is a method for selecting a frequency band to be used by a radio base station configured to communicate with a radio terminal, including:
 a step for acquiring an available frequency band, prior to start of an operation for a radio communication with the radio terminal, based on a radio communication condition of a peripheral base station; and
 a step for selecting, at start of the operation for the radio communication with the radio terminal, a frequency band to be used for the communication with the radio terminal from the available frequency band.

Effect of the Invention

According to the present invention, in an initial activation of a newly installed base station, the base station acquires the available frequency band based on the radio communication condition of the peripheral base station before starting the processing for the radio communication with the radio terminal, which has requested for the communication, and selects a frequency band to be used for the communication with the radio terminal from the available frequency band. Therefore, the newly installed base station may autonomously adjust the frequency band to use, without the field test which requires a staff for working thereon, in order to prevent from deteriorating quality of radio waves of existing peripheral base stations.

BRIEF DESCRIPTION OF DRAWINGS

FIG. 5A is a diagram illustrating the interference avoidance operation by the radio base station in FIG. 1;

FIG. 5B is a diagram illustrating the interference avoidance operation by the radio base station in FIG. 1;

DESCRIPTION OF EMBODIMENTS

Embodiments of the present invention will be described with reference to the accompanying drawings.

First Embodiment

Figure 1:
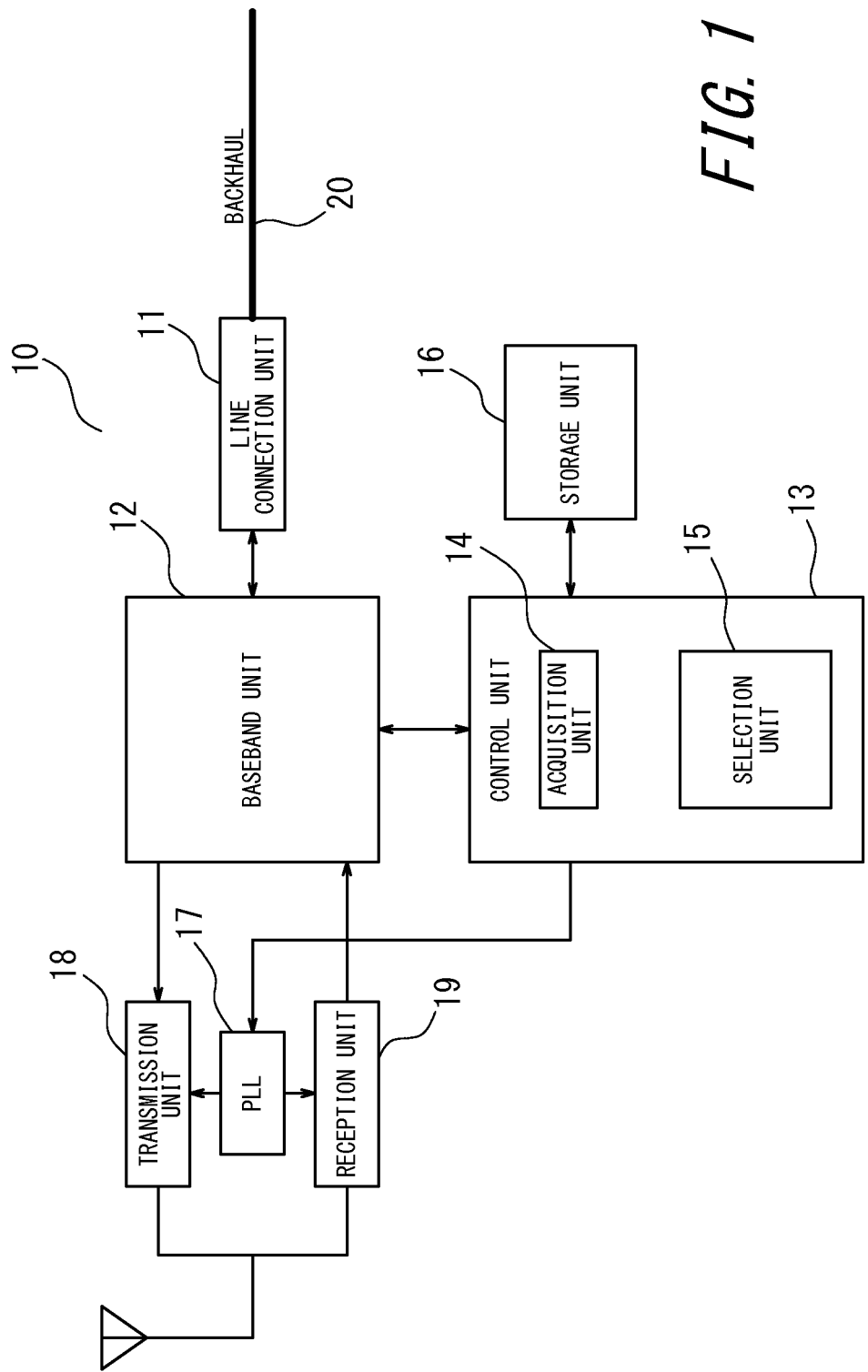
FIG. 1 is a diagram illustrating a schematic configuration of a radio base station according to a first embodiment of the present invention.

FIG. 1 is a diagram illustrating a schematic configuration of a radio base station according to a first embodiment of the present invention. A radio base station 10 is in conformity with LTE, for example, and relays a communication of a mobile phone.

The radio base station 10 includes a line connection unit 11, a baseband unit 12, a control unit 13, an acquisition unit 14, a selection unit 15, a storage unit 16, a PLL (Phase Lock Loop) 17, a transmission unit 18 and a reception unit 19.

The line connection unit 11 is connected to a line concentrator, which is connected to a backbone network via a backhaul 20 serving as a trunk. The baseband unit 12 is constituted by using LSI (Logic Scale Integration) and the like and performs baseband processing on signals transmitted from the transmission unit 18 or received by the reception unit 19 and signals transmitted and received via the line connection unit 11.

The control unit 13 is constituted by using a CPU and the like and includes the acquisition unit 14 and the selection unit 15. The acquisition unit 14 acquires information about an available frequency band based on a radio communication condition such as a frequency band and maximum transmission power used by an existing base station in the periphery of the self base station (hereinafter, referred to as a peripheral base station). Then, based on the information about the available frequency band acquired by the acquisition unit 14, the selection unit 15 assigns a band (radio resource) to a radio terminal which has transmitted a connection request to the self base station. Here, the storage unit 16 stores information such as the frequency band and a maximum transmission output of the peripheral base station that are acquired by the acquisition unit 14 in acquiring the available frequency band, a channel frequency assigned to the radio terminal by the selection unit 15, the maximum transmission output of the self base station and location information.

Also, the control unit 13 sets the frequency band of the transmission unit 18 and the reception unit 19 based on the available frequency band selected by the selection unit 15. Further, the control unit 13 controls such that the information such as the channel frequency assigned to the radio terminal by the selection unit 15, the maximum transmission output and the location information stored in the memory unit 16 are converted into a baseband signal by the baseband unit 12 and the baseband signal is transmitted to the peripheral base station via the line connection unit 11 and the backhaul 20.

Figure 2:
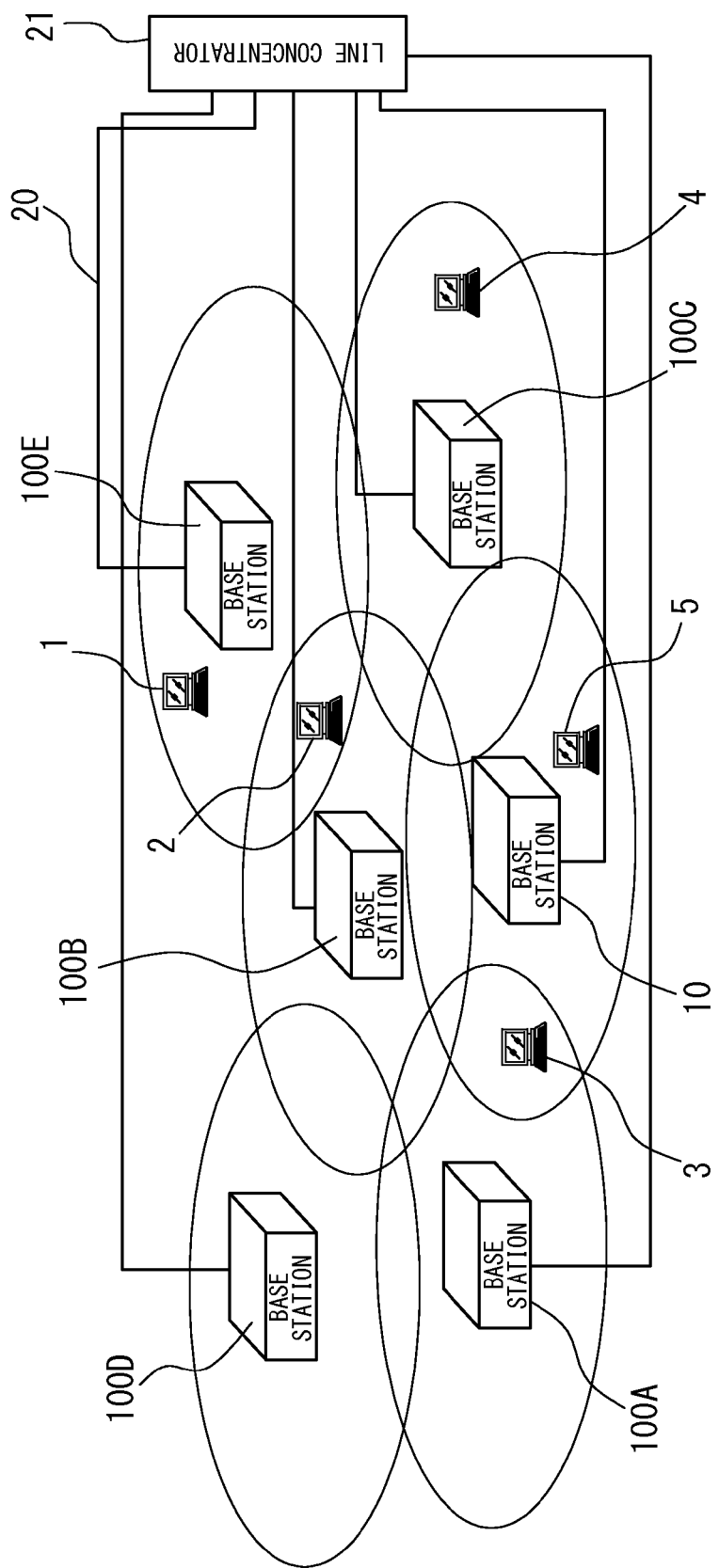
FIG. 2 is a diagram illustrating an example of a radio communication system using the radio base station in FIG. 1.

FIG. 2 is an example of a radio communication system using the radio base station 10 according to the present embodiment. It is assumed that base stations 100A-100E have already existed. Terminals 1-4 are positioned within respective service areas and able to communicate with one another, while a terminal 5 is positioned outside a service area and unable to communicate with other terminals. Here, it is assumed that the radio base station 10 is newly installed for expansion of the service area while the base stations 100A-100E are providing communication relaying service. Since the base station 10 is newly installed, the terminal 5, which was previously outside the service area, is enabled to communicate with other terminals. Each of the base stations 100A-100E and the radio base station 10 are connected to a line concentrator 21 via respective backhauls 20.

The radio base station 10 according to the present invention exchanges information with the existing base stations through the backhaul 20 by a method described in detail below with reference to FIG. 3 and autonomously adjusts the frequency band to be used for the self base station.

Figure 3:
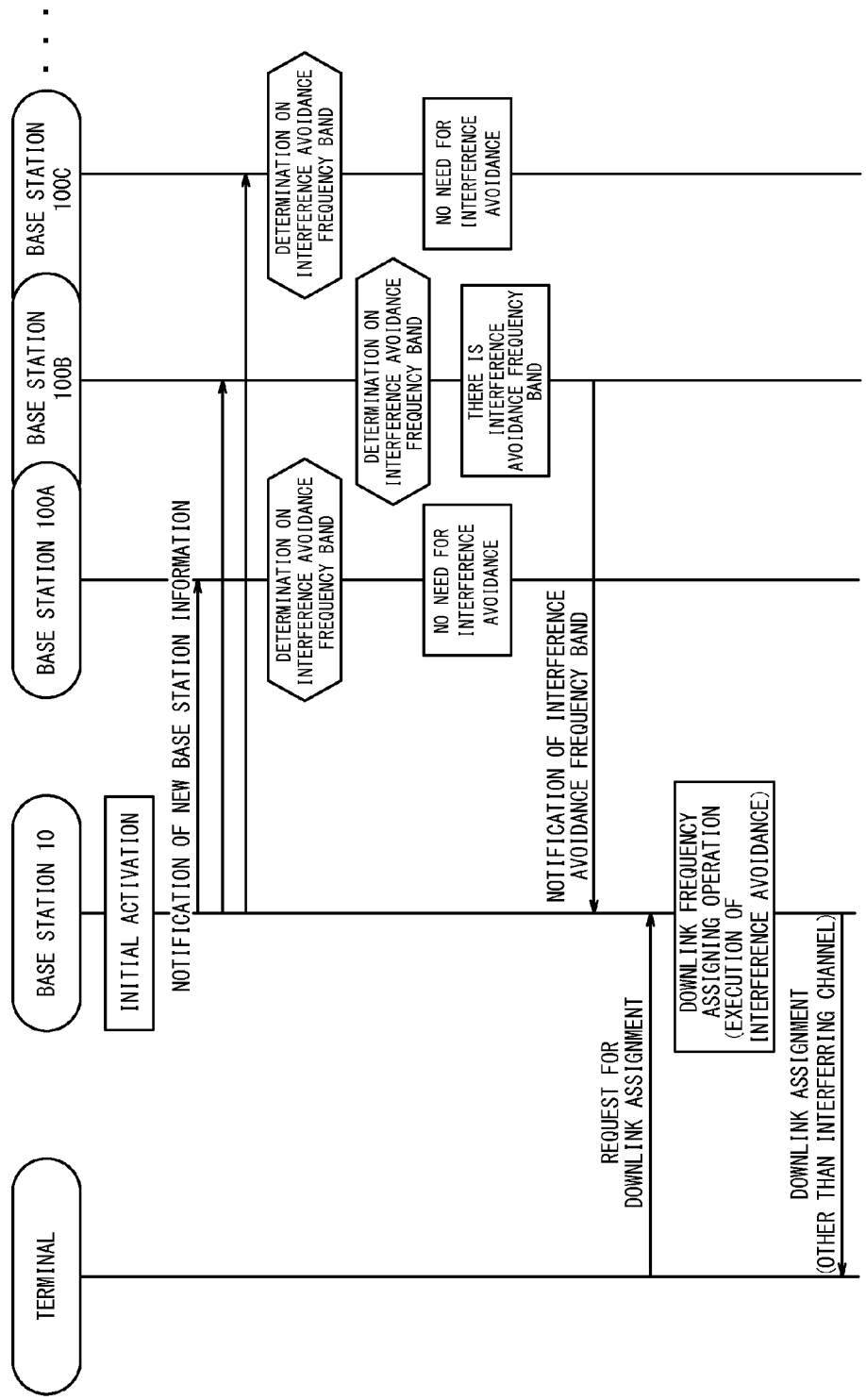
FIG. 3 is a sequence diagram illustrating operations of the radio base station in FIG. 1.

FIG. 3 is a sequence diagram illustrating operations of the radio base station 10 according to the present embodiment. Here, it is assumed that the radio base station 10 avoids interference by autonomously adjusting a downlink frequency band. The newly installed base station 10, in initial activation thereof before starting providing service as a relay base station, converts communication parameter information including the frequency band desired as the downlink frequency band by the self base station, the maximum transmission power and the location information of the base station into a signal by the baseband unit 12, and transmits the signal, via the line connection unit 11 and the line concentrator 21, to the peripheral base stations 100A-100C, which may possibly be interfered. Here, the frequency band desired as the downlink frequency band by the self base station is within, for example, a value range set for each carrier or a value range optionally set by a carrier at installation of the base station.

The peripheral base stations 100A-100C, based on the communication parameter information received from the radio base station 10, determine whether there is a frequency band the radio base station 10 needs to avoid using (that is, to perform interference avoidance) in the frequency band desired by the radio base station 10. When determining that there is a frequency band in need of interference avoidance, the peripheral base stations 100A-100C notify the radio base station 10 of this frequency band as an interference avoidance frequency band via the backhaul 20. Alternatively, such determination and notification may be performed by a base station management center (not illustrated) for supervising the base stations, instead of by the peripheral base stations 100A-100C. Although not illustrated, when there is no frequency band in need of interference avoidance, the peripheral base stations 100A-100C notify the radio base station 10 accordingly. By a similar operation, the radio base station 10 acquires the interference avoidance frequency band for an uplink frequency band, too.

When the radio base station 10 receives a communication request (request for assignment of the downlink frequency band) from the radio terminal, the radio base station 10 assesses interference avoidance in a manner described in detail below with reference to FIG. 4 and assigns a frequency band, other than a frequency band which may severely interfere, as the downlink frequency band to the radio terminal from which the communication request has been transmitted.

Figure 4:
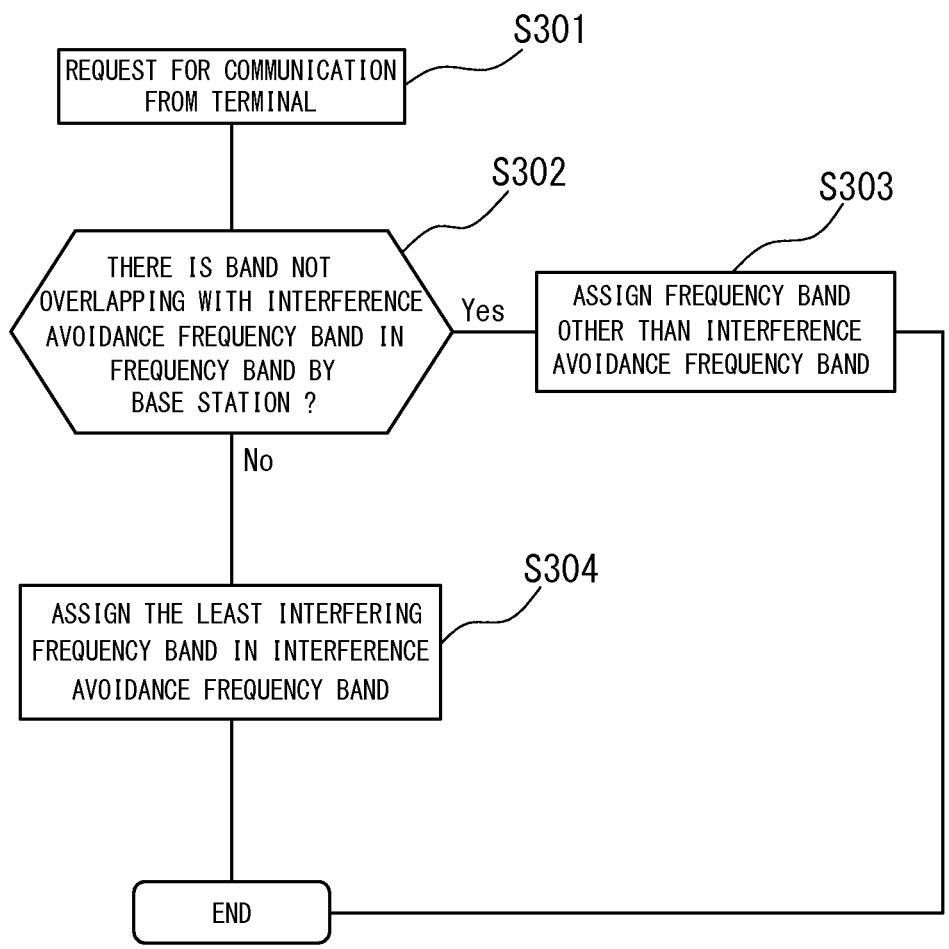
FIG. 4 is a diagram illustrating an example of an interference avoidance operation by the radio base station in FIG. 1.

FIG. 4 is a diagram illustrating an example of an interference avoidance operation by the radio base station according to the present embodiment. The acquisition unit 14 of the radio base station 10 acquires the interference avoidance frequency band by a method following the sequence diagram in FIG. 3. When receiving the communication request from the terminal (step S301), the acquisition unit 14 of the radio base station 10 determines whether there is a band which is not overlapping with the interference avoidance frequency band in the frequency band desired for the downlink by the self base station (step S302). That is, the acquisition unit 14 determines whether it is possible to assign the downlink frequency band to the terminal without using any frequency band overlapping with those of the peripheral base stations 100A-100C. When there is a frequency band which is not overlapping with the interference avoidance frequency band in the frequency band desired by the self base station, the selection unit 15 performs an assigning operation by using the frequency band (hereinafter, referred to as "a band I available for the radio base station 10") (step S303). Thereby, the downlink frequency band is selected.

On the other hand, when there is no frequency band which is not overlapping with the interference avoidance frequency band in the frequency band desired by the self base station, the selection unit 15 performs the assigning operation by using the least interfering frequency band (hereinafter, referred to as "a band II available for the radio base station 10") in the interference avoidance frequency band (step S304). Here, the least interfering frequency band is calculated based on, for example, a positional relationship with the peripheral base station and the maximum transmission output. Also, when it is determined at step S302 that the band I is unavailable for the radio base station 10, the radio base station 10 may reject the communication request from a terminal (not illustrated). In this case, the selection unit 15 does not assign any possibly interfering band to the terminal at step S304. As a result, high communication quality of other radio terminals in communication may be maintained.

FIG. 5A is a diagram illustrating a relationship, as a case 1, among the band desired by the radio base station 10, the bands used by the peripheral base stations 100A-100C and the band I available for the radio base station 10 when the operation proceeds from step S302 to step S303. FIG. 5B is a diagram illustrating a relationship, as a case 2, between the above bands when the operation proceeds from step S302 to step S304.

In the case 1, there is a band III, which is not used by any of the peripheral base stations 100A-100C, in the band desired by the radio base station 10. Accordingly, the selection unit 15 of the radio base station 10 performs band assignment at the band I corresponding to the band III to the terminal. In the case 2, on the other hand, the entire band desired by the radio base station 10 is used by the peripheral base stations 100A-100C. Therefore, the selection unit 15 of the radio base station 10 performs band assignment to the terminal at the band II, which is the least interfering frequency band in the bands used by the peripheral base stations 100A-100C.

According to the radio base station 10 of the present embodiment, as described above, in determining the frequency band to be used by the self radio base station, the radio base station 10 communicates with the existing peripheral base stations 100A-100C in order to avoid the frequency band which is likely to interfere. Accordingly, expansion of the service area is enabled without deteriorating the communication quality of the peripheral base stations 100A-100C.

Second Embodiment

Figure 6:
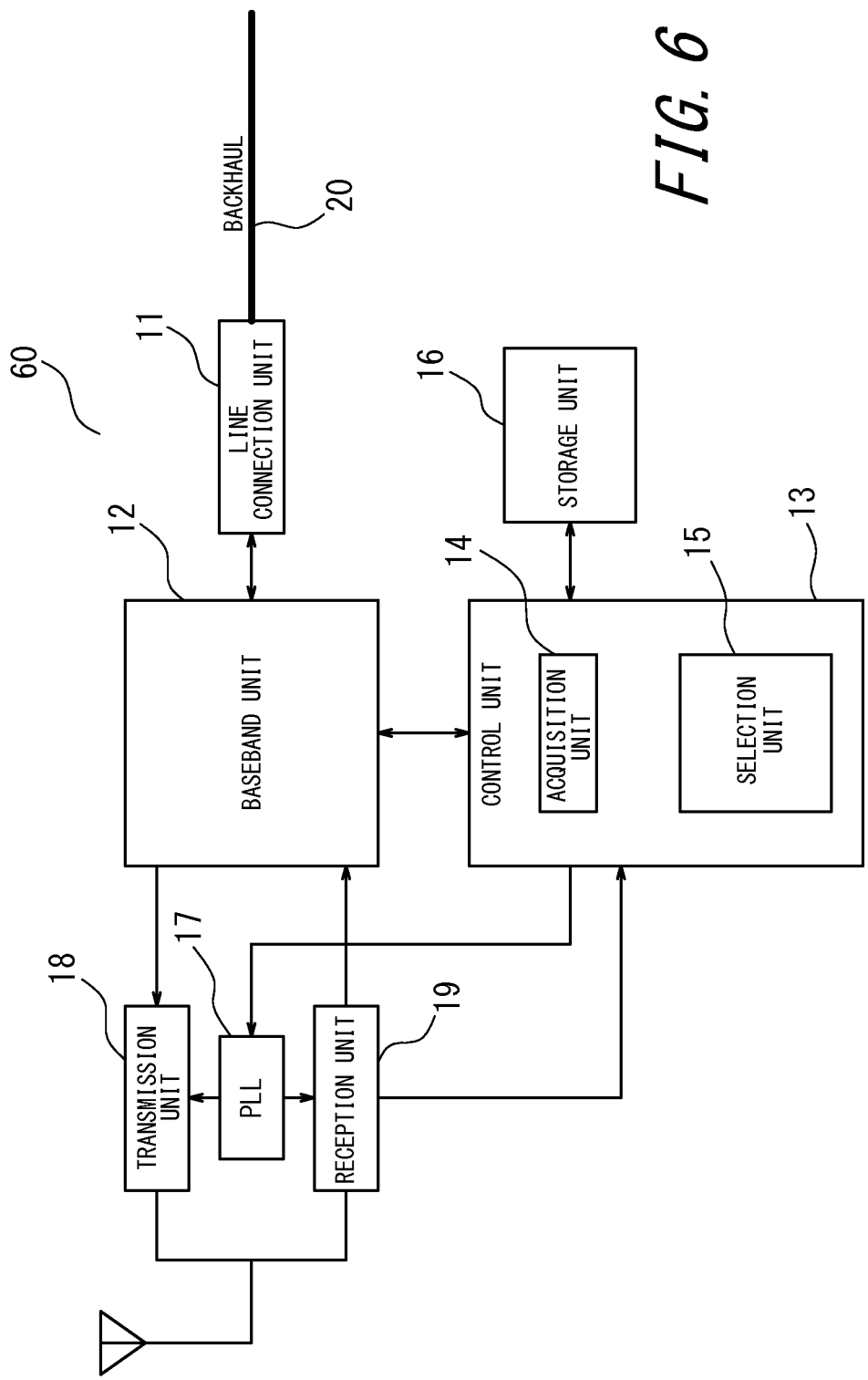
FIG. 6 is a functional block diagram illustrating a base station according to a second embodiment of the present invention.

FIG. 6 is a functional block diagram illustrating a base station according to a second embodiment of the present invention. A radio base station 60 has the same configuration as that illustrated in FIG. 1 except that an output received by the reception unit 19 is supplied to the acquisition unit 14 of the control unit 13. The same components of the radio base station 60 as those of the radio base station 10 in FIG. 1 are provided with the same reference signs. The acquisition unit 14 acquires an available frequency band based on the signal received by the reception unit 19. That is, the acquisition unit 14, based on the signal received by the reception unit 19, measures the downlink frequency band used by the peripheral base stations, the uplink frequency band of the terminals in the periphery of the radio base station 60 and received power of those and acquires the frequency band having a value of received power exceeding a predetermined threshold as the interference avoidance frequency band. Accordingly, the radio base station 60 may avoid the frequency band reached by the power whose value exceeds the predetermined threshold and deterioration of the communication quality may be prevented.

Figure 7:
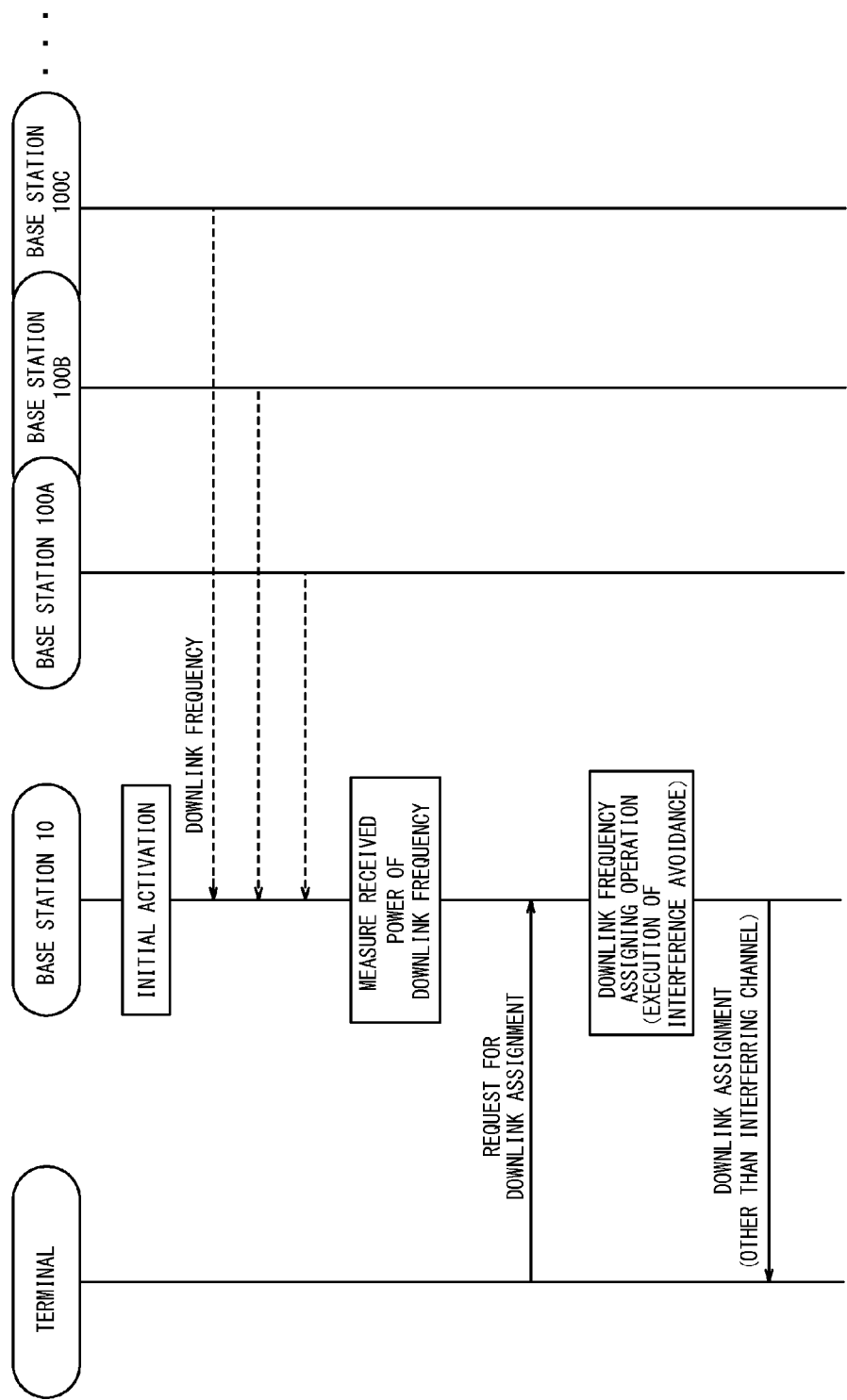
FIG. 7 is a sequence diagram illustrating operations of the radio base station in FIG. 6.

FIG. 7 is a sequence diagram illustrating operations of the radio base station 60 performed in this case. The acquisition unit 14 of the radio base station 60, prior to start provision of service as a relay base station after initial activation of the radio base station 60, measures the downlink frequency bands of the peripheral base stations 100A-100C and the values of the received power thereof based on the signal received by the reception unit 19. Then, the radio base station 60 acknowledges the interference avoidance frequency band based on a result of the measurement and assigns the downlink frequency band to the radio terminal, from which the communication request (a downlink frequency assignment request) is transmitted, by using the frequency band other than the interference avoidance frequency. By a similar procedure, the radio base station 60 avoids interference and assigns the uplink frequency band.

Figure 8:
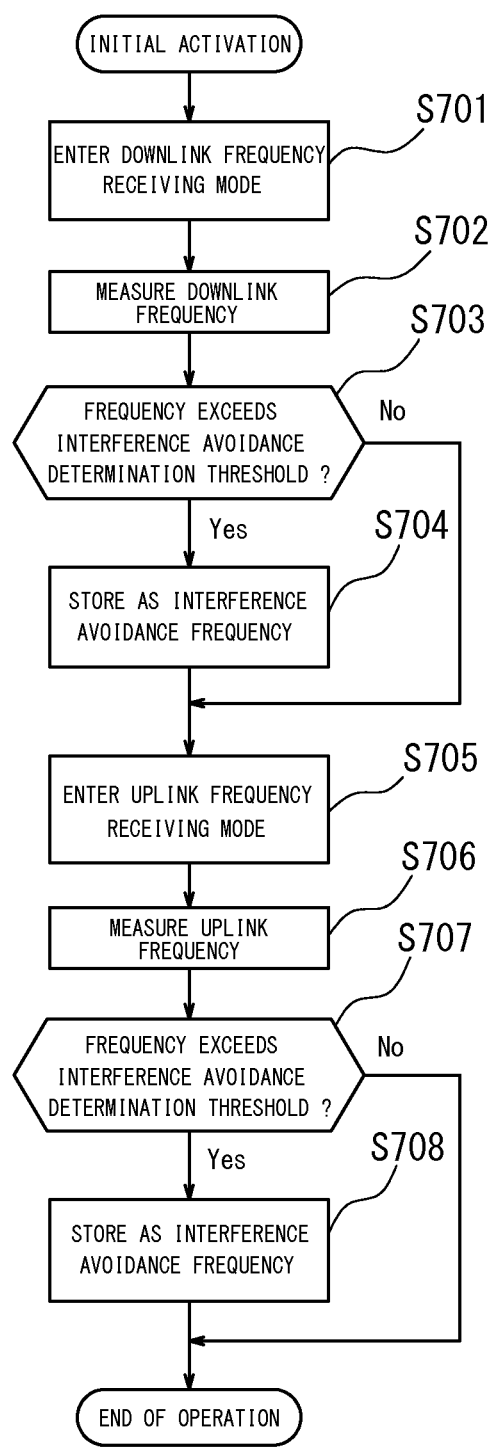
FIG. 8 is a flowchart illustrating operations of the radio base station in FIG. 6.

FIG. 8 is a flowchart illustrating operations of the radio base station according to the present embodiment. After initially activated, the radio base station 60 enters a downlink frequency receiving mode (step S701). Then, based on the received signal, the acquisition unit 14 measures the downlink frequency bands of the peripheral base stations 100A-100C and the received power thereof (step S702). Also, the acquisition unit 14 determines whether an intensity of the received power of each of the downlink frequency bands exceeds the predetermined threshold (hereinafter, referred to as an interference avoidance determination threshold) (step S703). When the acquisition unit 14 determines as a result that the intensity of the received power exceeds the predetermined threshold, the control unit 13 stores the frequency band as the interference avoidance frequency band in the storage unit 16 (step S704).

Subsequently, the acquisition unit 14 of the radio base station 60 enters an uplink frequency receiving mode (step S705). Then, the acquisition unit 14 measures the uplink frequency band from the terminal and the received power thereof (step S706). Further, the acquisition unit 14 determines whether each of the received uplink frequency bands exceeds the interference avoidance determination threshold (step S707). When the acquisition unit 14 determines as a result that the uplink frequency band exceeds the predetermined threshold, the control unit 13 stores the frequency band as the interference avoidance frequency band in the storage unit 16 (step S708).

The radio base station 60 according to the present embodiment may measure the frequency bands used by the peripheral base stations and the maximum transmission power thereof based on the signal received by the reception unit 19 and assign the frequency band to the radio terminal while avoiding interference with the frequency bands of the peripheral base stations. Therefore, the radio base station 60 may autonomously select the frequency band to be used by the self base station without a burden to notify the peripheral base stations 100A-100C.

It is to be understood that the present invention is not limited to the embodiments set forth above but may be modified or varied in a multiple of manner. For example, although the radio base station according to the first embodiment notifies the peripheral base stations 100A-100C or the base station management center of the frequency band desired by the self base station, the base station 10 may obtain the frequency bands used by the peripheral base stations 100A-100C through the backhaul 20 and acquire an available frequency band based on the acquired frequency bands. In this case, there is no need for the peripheral base stations 100A-100C or the base station management center to determine the interference avoidance frequency, thus the operation to assign the frequency band is simplified.

REFERENCE SIGNS LIST

1-5 Terminal
10 Radio Base Station
11 Line Connection Unit
12 Baseband Unit
13 Control Unit
14 Acquisition Unit
15 Selection Unit
16 Storage Unit
17 PLL
18 Transmission Unit
19 Reception Unit
20 Backhaul
21 Line Concentrator
60 Radio Base Station
100A-E Radio Base Station

The invention claimed is:

1. A radio base station connected to a line concentrator via a trunk and configured to communicate with a radio terminal, comprising:
   an acquisition unit configured to acquire an available frequency band based on a radio communication condition of a peripheral base station, prior to start of a radio communication with the radio terminal; and
   a selection unit configured to select, at start of the radio communication with the radio terminal, a frequency band to be used for the communication with the radio terminal from the available frequency band,
   wherein the acquisition unit transmits information including a frequency band desired by the self base station via the trunk and the line concentrator to the peripheral radio base station and acquires the radio communication condition based on a response on the information received from the line connection unit via the trunk and the line concentrator.

2. The radio base station according to claim 1, wherein the acquisition unit acquires the available frequency band based on received power of a downlink frequency band and an uplink frequency band used by the peripheral radio base station.

3. The radio base station according to claim 2, wherein the acquisition unit acquires a frequency band other than a frequency band having the received power exceeding a predetermined threshold as the available frequency band.

4. The radio base station according to claim 1, wherein the response comprises information of a frequency band which the self base station needs to avoid using.

5. The radio base station according to claim 1, wherein when the acquisition unit is unable to acquire an available frequency band based on a radio communication condition of the peripheral base station, the selection unit selects a least interfering frequency band to use for communication with the radio terminal from bands being used by the peripheral base station.

6. A method for selecting a frequency band to be used by a radio base station configured to communicate with a radio terminal, comprising:
   acquiring an available frequency band based on a radio communication condition of a peripheral base station, prior to start of an operation for a radio communication with the radio terminal; and
   selecting, at start of the radio communication with the radio terminal, a frequency band to be used for the communication with the radio terminal from the available frequency band,
   transmitting information including a frequency band desired by the self base station via a trunk and a line concentrator to the peripheral base station; and
   acquiring the radio communication condition based on a response on the information received via the trunk and the line concentrator.

7. The method for selecting a frequency band to be used by a radio base station configured to communicate with a radio terminal according to claim 6, wherein the response comprises information of a frequency band which the self base station needs to avoid using.

8. The method for selecting a frequency band to be used by a radio base station configured to communicate with a radio terminal according to claim 6, wherein when an available frequency band based on a radio communication condition of the peripheral base station cannot be acquired, the method further comprises:
   selecting a least interfering frequency band to use for communication with the radio terminal from bands being used by the peripheral base station.

* * * * *